United States Patent [19]

Poplawski et al.

[11] Patent Number: 4,713,012
[45] Date of Patent: Dec. 15, 1987

[54] PORTABLE DEVICE FOR MODELING VEHICLE GRAPHICS

[75] Inventors: Judith A. Poplawski; David J. Andersen, both of Racine, Wis.

[73] Assignee: Color Arts, Inc., Racine, Wis.

[21] Appl. No.: 853,188

[22] Filed: Apr. 17, 1986

[51] Int. Cl.⁴ ............................................. G09B 25/00
[52] U.S. Cl. ..................................... 434/373; 434/81; 434/365; 40/539; 446/488
[58] Field of Search ............... 434/81, 72, 209, 211, 434/105, 365, 367, 373, 403, 428, 430, 433; 40/538, 539; 446/88, 93, 94, 95, 487, 488

[56] References Cited

U.S. PATENT DOCUMENTS

| | | | |
|---|---|---|---|
| 1,432,400 | 10/1922 | Levy | 434/365 |
| 1,757,243 | 5/1930 | Goldberg | 446/488 |
| 2,028,377 | 1/1936 | Bernasconi | 446/488 X |
| 2,079,264 | 5/1937 | Rike | 434/365 X |
| 2,939,242 | 6/1960 | Papadakis | 446/88 X |
| 3,359,657 | 12/1967 | Hedberg | 434/211 |
| 3,726,027 | 4/1973 | Cohen et al. | 434/303 X |
| 4,643,349 | 2/1987 | Sheffer | 446/488 X |
| 4,643,697 | 2/1987 | Sheffer | 446/488 |
| 4,646,959 | 3/1987 | Sheffer | 446/488 X |
| 4,657,520 | 4/1987 | Sheffer | 446/488 |
| 4,661,082 | 4/1987 | Sheffer | 446/488 |

FOREIGN PATENT DOCUMENTS 1208949 10/1970 United Kingdom ................ 434/333

Primary Examiner—William H. Grieb
Attorney, Agent, or Firm—Peter N. Jansson, Ltd.

[57] ABSTRACT

A portable device for modeling of vehicle graphics having two flat opposite side panels each forming a side profile of the vehicle, at least two flat cross panels extending between the side panels and including front and back panels forming front and back profiles of the vehicle, respectively, hinged interconnections of the cross panels to the side panels such that the structure is erectable to a three-dimensional vehicle model and collapsible to a flat stack, and provision for replaceable attachment of graphics-bearing sheets on the panels. Preferred embodiments include a foldable enclosure dimensioned when folded to receive the collapsed flat stack and when unfolded to serve as a display mount.

20 Claims, 8 Drawing Figures

PORTABLE DEVICE FOR MODELING VEHICLE GRAPHICS

FIELD OF THE INVENTION

This invention is related generally to means for depicting proposed graphics for large objects and, more particularly, to portable three-dimensional devices for modeling vehicle graphics.

BACKGROUND OF THE INVENTION

In recent years there has been an increasing use of bold, large and often colorful graphic displays on automotive vehicles such as trucks. Various kinds of trucks, such as panel trucks, light and heavy vans, and especially tractor-trailers, offer wide and substantially uninterrupted vertical surfaces (or "panels") which can accommodate large graphics displays. Recently, such displays have more frequency included more than just company names, trademarks and logos. They often include large colorful illustrations of the company's products, illustrations of customers using the products, or pictures of nature scenes such as lakes, rivers or mountains which fit the company's advertising theme.

Such vehicles become in effect moving billboards which are an effective and low-cost advertising tool. Given the available space and the advertising potential, it is surprising that trucks and other vehicles are not more frequently used for this purpose. More often than not, trucks are seen with little or no graphics on their major side and back panels. This is in large part due to the fact that the advantages of using bold vehicle graphics are not communicated well to the parties responsible for trucking operations.

When consideration is being given to how available vehicle panel space can be utilized, it is often desirable to consider several alternatives for vehicle graphics. A process of proposing, considering, then accepting or rejecting different vehicle graphics may ensue. In many cases, many design proposals may be considered and rejected before acceptable vehicle graphics are chosen.

The process of proposing, understanding and selecting vehicle graphics has often been time-consuming and expensive. For the decision makers to fully appreciate the "look" that a particular vehicle graphics proposal gives is often quite difficult.

Those proposing vehicle graphics would often show sketches of the appropriate type of vehicle decorated with the vehicle graphics proposed. Such sketches, while helpful, often fall considerably short of providing an understandable and lifelike display of the proposal. Providing a second proposal would often involve the need to prepare a new drawing of the vehicle with the new vehicle graphics included.

Sometimes, a two-dimensional display was used and the graphics portion was changed to show a new proposal. This also failed to give a good approximation of the appearance of the decorated vehicle. Of course, a three-dimensional model of the vehicle could be toted around by those making the vehicle graphics presentation, but that is inconvenient and bulky to carry, and would not very well accommodate the needs of the person making the vehicle graphics proposal.

In short, there has been a need for an improved means to realistically illustrate vehicle proposals for vehicle graphics. In particular, there has been a need for a portable non-bulky device for realistically modeling proposed vehicle graphics.

SUMMARY OF THE INVENTION

The device of this invention provides an improved means for modeling of vehicle graphics. The device is an easily portable erectable-collapsible three-dimensional vehicle model which conveniently gives a realistic appearance of a vehicle with various alternative vehicle graphics.

The inventive portable device for modeling of vehicle graphics includes first and second flat opposite side panels, each in the form of a side profile of the vehicle, two or more flat cross panels extending between the side panels, means hinging the cross panels to the first and second side panels, and means for replaceable attachment of graphic sheets on the panels. The cross panels include a front panel forming a front profile of the vehicle and back panel forming a back profile of the vehicle.

While there are at least two flat cross panels extending between the first and second side panels, in certain preferred embodiments there are three cross panels. For example, when the device is a model of a tractor-trailer, cross panels can represent the front of the tractor, the front of the trailer, and the back of the trailer. The cross panel representing the front of the trailer is sometimes referred to herein as a intermediate cross panel.

The structure of hinged interconnected panels is erectable to a three-dimensional vehicle model and collapsible to a flat stack. In preferred forms, the device of this invention includes a foldable substantially flat enclosure which is dimensioned when folded to receive the collapsed flat stack for storage and when unfolded serves as a display mount for the erected three-dimensional vehicle model.

In certain preferred embodiments, at least one of the cross panels and at least one of its adjacent side panels is of a continuous board, and the hinging means therebetween is a fold in such continuous board. The continuous board is preferably a flexible thin material, such as paperboard, and the fold is preferably at a slit which is across the continuous board partially through the thickness of the flexible material.

Each of the cross panels is preferably continuous with and hinged to both of its adjacent side panels in this preferred manner. In highly preferred embodiments, all of the panels are made of a continuous single piece of flexible board, such as paperboard, and slits and folds across such continuous board define the edges of adjacent panels and form the hinges therebetween. Use of a single continuous board allows low-cost preparation of the portable modeling device of this invention.

In another preferred embodiment, the hinging means is of tape. Such embodiments have adjacent panels made of separate boards and an interconnecting tape piece or pieces serve as hinges between such adjacent panels.

In preferred embodiments, the means for replaceable attachment of a graphics sheet on a panel is a pocket formed by the panel and a transparent sheet overlying the panel. Such transparent sheet, which is preferably flexible, is preferably secured to the panel along its bottom edge. In the most preferred embodiments, such transparent sheet is secured to the panel only along the bottom edge, such that the transparent sheet may be bent away from the panel temporarily to facilitate insertion and removal of replaceable graphic sheets.

Means for replaceable attachment of graphic sheets may be included on several of the panels. Typically, the side panels offer the biggest space for elective vehicle graphics, particularly when the vehicle is a tractor-trailer. However, vehicle graphics may be included on the back panel, the front panel, and other intermediate cross panels. For example, the case of a tractor-trailer, one intermediate panel can represent the front of the trailer, and such panel may have a transparent overlay like the side panels, or other means for replaceable attachment of graphic sheets thereon.

In certain preferred embodiments, at least one and preferably each of the side panels includes a rectangular main portion representing, for example, a principal vehicle surface which is free to be covered with a graphics display. Such main portion includes a bottom edge along which an overlying transparent sheet is attached.

Each such side panel also preferably includes projections from such bottom edge which form vehicle wheel profiles. These projections support the vehicle model when it is standing upright for display and demonstration of graphics, and may be insertable into a display mount which forms a part of certain preferred embodiments of this invention.

Such embodiments include a foldable substantially flat enclosure-display mount. Such enclosure-display mount is dimensioned when folded to receive the collapsed flat stack for storage. When it is unfolded it serves as a display mount for the erected three-dimensional vehicle model. Such enclosure-display mount has means thereon, preferably slots, for engaging the side panel projections for mounting of the vehicle model thereon.

Such display mount also includes a surface with vehicle environment depictions thereon. Such vehicle environment depictions are preferably of a roadway with roadway markings such as lines. Thus, the erected three-dimensional vehicle model, which may represent a truck, may be shown in a very realistic setting. This helps to give a more accurate impression of how the vehicle will appear with various vehicle graphics.

In preferred embodiments, permanent vehicle characteristic markings are included on portions of the side panels and cross panels. These include, for example, in the case of a tractor-trailer, markings showing the wheels, hubcaps, cab doors, vertical muffler and stack, gas tank, windshield, grille, license plate, trailer doors, and the like.

This portable device for modeling of vehicle graphics may be conveniently carried flat in a salesman's briefcase. It provides a convenient tool for dramatically illustrating how a potential customer's vehicles can be made to appear using several different vehicle graphics proposals. The salesman or other person making a demonstration to a poential customer would erect the device on the customer's desk and then use different sets of vehicle graphic sheets one after the other until the customer is satisfied with the overall impression and places his order.

OBJECTS OF THE INVENTION

It is an object of this invention to provide an improved means for aiding decision making regarding a choice of graphics for vehicles such as trucks.

Another object of this invention is to provide an improved portable device for modeling of vehicle graphics.

Another object of this invention is to provide a means for improved accurate perception of the appearance that vehicles will have when such vehicles are covered with proposed graphics.

Another object of this invention is to provide a portable device for modeling of vehicle graphics which may easily be carried in a briefcase.

These and other objects will be apparent from the following additional descriptions and from the drawings, wherein:

DETAILED DESCRIPTIONS OF PREFERRED EMBODIMENTS

Figure 1:
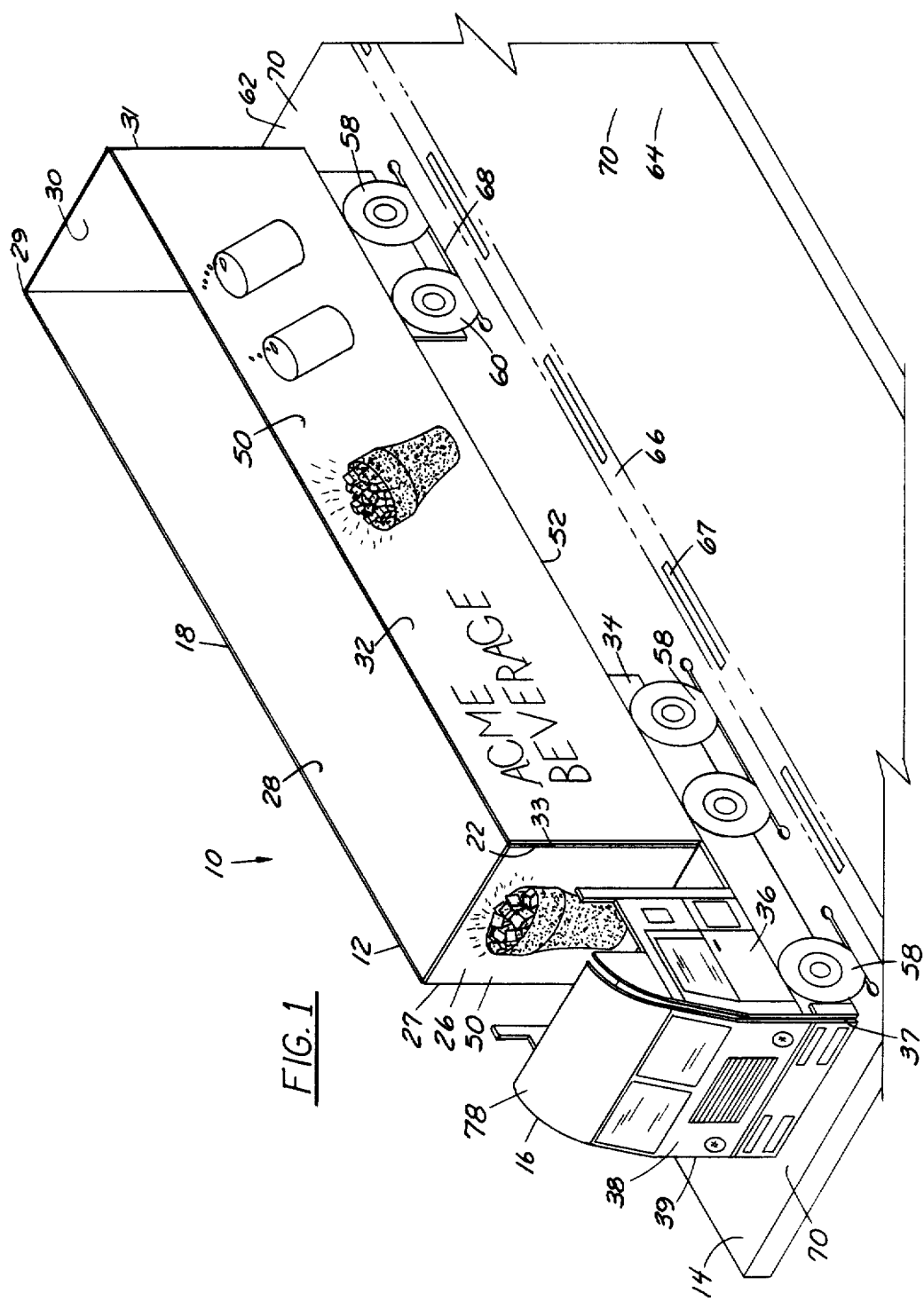
FIG. 1 is a perspective view of a portable vehicle graphics modeling device in accordance with this invention, in an erected three-dimensional condition.

The figures illustrate a portable device 10 for modeling of vehicle graphics, which is in accordance with this invention. Portable device 10 includes an erectable-collapsible vehicle model 12 and an enclosure-display mount 14 on which erected vehicle model 12 is mounted and in which collapsed vehicle model 12 is stored.

Vehicle model 12 represents a tractor-trailer having a cab or tractor portion 16 and a trailer portion 18. Vehicle model 12 is formed of a single continuous piece 20 of paperboard, which is illustrated in unconstructed form in FIG. 6. Paperboard piece 20 is slit at slits 22. Each slit 22 extends partially through the thickness of paperboard piece 20 to define panels therebetween. Slits 22 are means between such panels hinging adjacent panels to one another.

Figure 2:
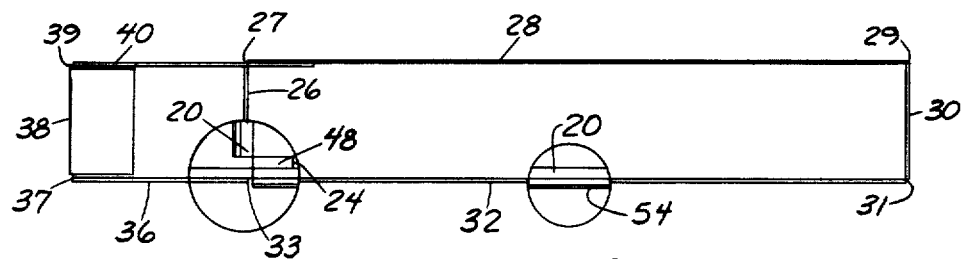
FIG. 2 is a top plan view of FIG. 1.
Figure 6:
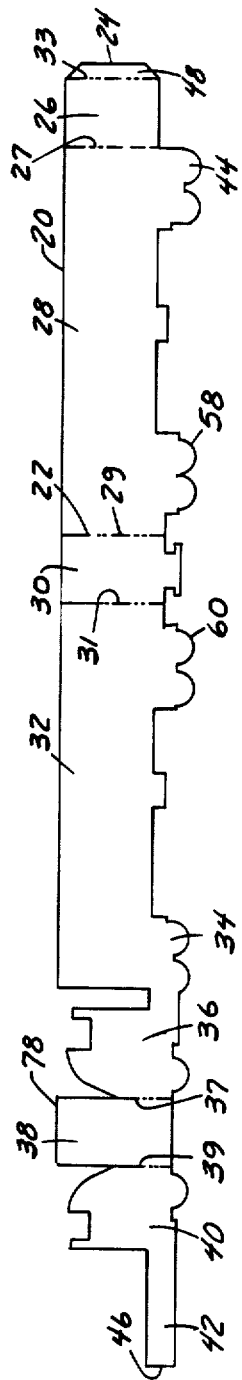
FIG. 6 is a reduced plan view of a paperboard form used for construction of the portable device of this invention.

As illustrated best in FIGS. 2 and 6, paperboard piece 20 extends from a first edge 24 successively through the following panels: an intermediate cross panel 26 which forms the front of trailer portion 16; a first trailer side panel 28 which is connected to cross panel 26 at hinge 27; a back cross panel 30 which is connected to first trailer side panel 28 at hinge 29; and a second trailer side panel 32 which is connected to back panel 30 at hinge 31 and to intermediate cross panel 26 at hinge 33. Second trailer side panel 32 includes a lower portion 34 which extends beyond intermediate cross panel 26 and becomes a part of what is referred to herein as a second tractor side panel 36.

Continuing with a description of the successive panel portions of paperboard piece 20, second trailer side panel 36 is connected to a front cross panel 38 at hinge 37, and a first tractor side panel 40 is connected to front cross panel 38 at hinge 39. First tractor side panel 40 includes a lower portion 42 which overlaps and is attached in face-to-face fashion, by glueing or otherwise, with a lower portion 44 at first trailer side panel 28. The overlapping portion of lower portion 42 of first tractor side panel 40 terminates in a second edge of paperboard piece 20.

At first edge 24, previously mentioned, there is an overlapping portion 48 which continuous with intermediate cross panel 26 and is attached in face-to-face fashion, by glueing or otherwise, to second trailer side panel 32 along the end thereof which is adjacent to hinge 33.

First tractor side panel 40 and first trailer side panel 28 are sometimes referred to herein together as one side panel, as are second tractor side panel 36 and second trailer side panel 32. Such full side panels are referred to herein as first and second flat opposite side panels.

The two side panels 28,40 and 32,36 each form a side profile of a tractor-trailer. Likewise, front panel 38 and back panel 30 form front and back profiles, respectively, of the tractor-trailer.

Each of the aforementioned panels is flat and each of the hinges is parallel to every other hinge. Therefore, vehicle model 12 may be erected to form a three-dimensional vehicle model or collapsed to a flat stack for carrying or storage.

Several of the panels have large essentially flat expanses which represent the comparable flat vehicle surfaces. These are capable of receiving and displaying major vehicle graphics. For example, for first and second opposite trailer side panels 28 and 32 provide such display spaces, as do intermediate cross panel 26 and back panel 30. Indeed, if desired, first and second tractor side panels 36 and 40 and front panel 38 as well can provide display spaces for graphics. The primary display surfaces however are panels 28, 32, 26 and 30.

Each of the panels of trailer portion 18, that is, panels 28, 32, 26 and 30, includes a rectangular main portion 50 (see FIGS. 3 and 5) having a bottom edge 52. Overlying each such rectangular main portion 50 is a transparent sheet 54 which is secured to the panel along bottom edge 52. Transparent sheet 54 is attached to its panel only along bottom edge 52, preferably by means of a face-to-face adhesive interconnection.

Figure 5:
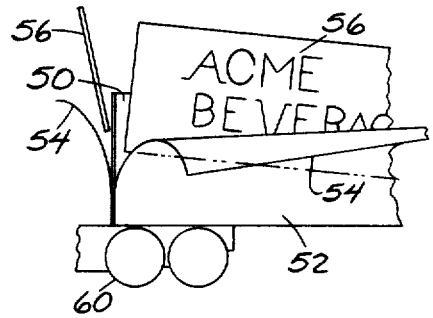
FIG. 5 is a fragmentary side elevation illustrating use of a preferred means for replaceable attachment of graphic sheets on adjacent vehicle panels.

As illustrated in FIG. 5, transparent sheets 54 are of a material which may readily be bent or flexed away from the panel, while remaining secured thereto along bottom edge 52. This facilitates insertion and removal of replaceable graphics sheets 56 from the pocket which is formed between transparent sheet 54 and rectangular main portion 50 of the panel. The material used for transparent sheet 54 is such that it will spring back into (or close to) full face-to-face contact with replaceable graphics sheet 56 or, when the pocket is empty, into full contact with rectangular main portion 50 of the panel.

In addition to rectangular main portion 50, side panels 28,40 and 32,36 have projections 58 which extend from bottom edge 52 and which form the aforementioned lower portions 34, 42 and 44. Projections 58 represent the wheels of vehicle model 12. Vehicle model 12 rests on the lower edges 60 of projections 58 when it is in its erected three-dimensional form.

Projections 58, all or most of trailer side panels 32 and 40, front panel 38, and portions of the other panels have permanent vehicle characteristic markings thereon. For example, such portions have lines and other markings representing hubcaps, vehicle doors, windows, mirrors, mufflers, exhaust pipes and the like. Such vehicle characteristic markings may be printed on the panel surfaces or may be printed on a covering sheet which has been adhered to the panels. It is particularly convenient to print such vehicle characteristic markings on the material which is used for transparent sheet 54, and having such sheet extend well beyond rectangular main portions 50 to cover part or all of the remaining portions of the several panels.

Enclosure-display mount 14 itself is preferably formed of paperboard, in the form of a very shallow box or other folder. Enclosure-display mount 14 includes first and second portions 62 and 64, respectively, which are formed of one piece of material having a fold edge 66.

Figure 7:
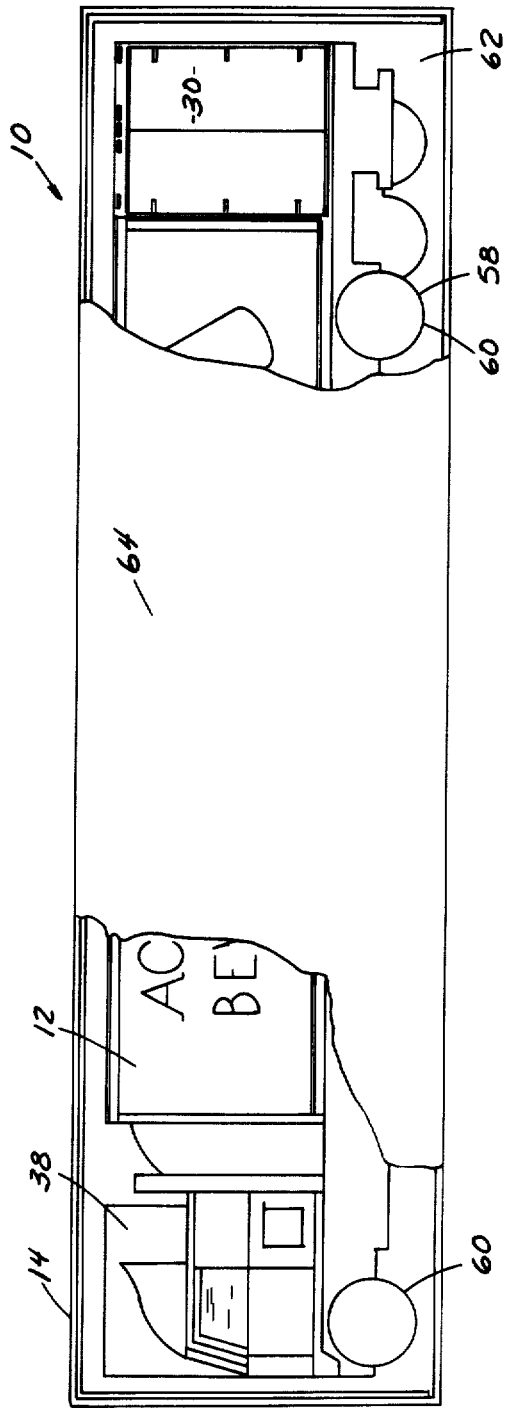
FIG. 7 is a partially cutaway plan view of the vehicle model collapsed to a flat stack and contained in a carrying enclosure during non-use.

When enclosure-display mount 14 is folded, as shown in FIG. 7, it forms an enclosure for vehicle model 12 in its collapsed, flat-stack form. When enclosure-display mount 14 is unfolded, as illustrated in FIG. 1, it forms a display mount for vehicle model 12 in its erected three-dimensional form.

As illustrated best in FIGS. 1 and 7, second portion 64 of enclosure-diaplay mount 14 has a number of slots 68 cut through it. Slots 68 are positioned to receive the lower edges 60 of projections 58, thus serving to hold the erected three-dimensional vehicle model 12 in its proper position and condition of erection.

First and second portions 62 and 64 of enclosure-display mount 13 have outside surfaces 70 which have vehicle environment depictions thereon. For example, outside surfaces 70 are colored or covered or otherwise marked to duplicate the appearance of the surface of a roadway. This may be further enhanced by including simulated lane dividing marks 67 along fold edge 66, such that the outside surface 70 of first portion 68 represents one lane and the outside surface 70 of second portion 64 represents an adjacent lane of a two-lane highway.

Vehicle model 12 when mounted on enclosure-display mount 14 provides a substantial degree of realism to accurately illustrate how such vehicle would appear to an observer when decorated with various proposed vehicle graphics.

A preferred continuous paperboard material for use in this invention is a 2-side coated 8-ply white long grain illustration board, 0.024 inch thick, which is made and sold by Beveridge Paper Company, a subsidiary of Simkins Industries, of Indianapolis, Ind., under the trademark BLANKOTE. A wide variety of other flexible paperboard materials, as well as a great variety of plastics and other materials, may be used.

A highly preferred transparent sheet material is a 0.004 inch transparent polyester sheet material, a common material available from many suppliers. The transparent sheet material is flexible and resilient such that it will spring back into engagement with the panel. Many suitable materials are available commercially for such sheet. Furthermore, other means can be used for replaceable attachment of graphic sheets on the panels.

The replaceable graphic sheets may be any kind of paper or other thin material. They are preferably materials on which graphic designs may readily be placed.

Figure 8:
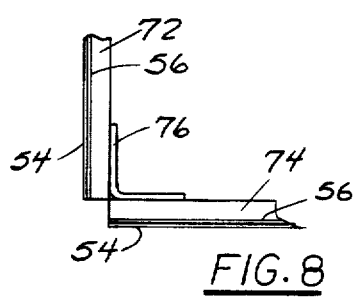
FIG. 8 is an enlarged fragmentary top plan view illustrating an alternative embodiment of the hinging means.

As noted, the preferred hinging means consist of slits and folds in a continuous paperboard or other board material. However, other hinging means can be used, and separate boards can be used for adjacent panels. FIG. 8 illustrates one such arrangement, in which separate adjacent panels 72 and 74 are joined by an interconnecting strip of tape 76. Each of the side panels and cross panels can be separate and to be interconnected to their adjacent panels in this manner.

The interconnection of the overlying transparent sheets and their respective panel surfaces are preferably only along the lower edges of the rectangular main portions of the panels. Such transparent sheets could be secured instead along other panel edges or along two or three panel edges.

Figure 3:
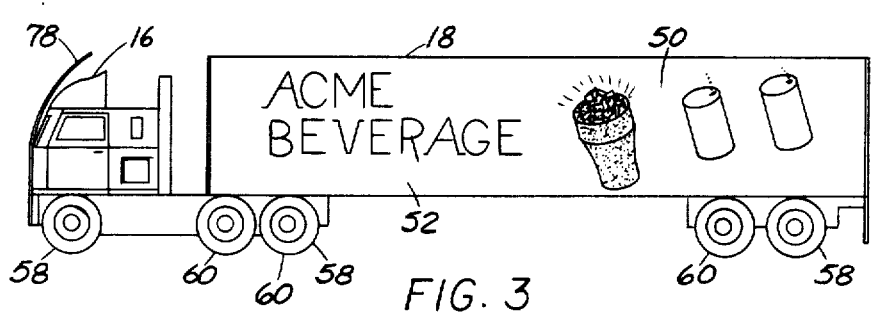
FIG. 3 is a side elevation.
Figure 4:
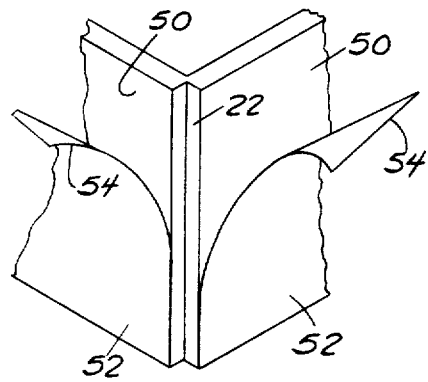
FIG. 4 is an enlarged fragmentary perspective view showing the hinged interconnection of a side panel with an adjacent cross panel.

While the panels forming the vehicle model are flat, in some cases the appearance of the portable device of this invention may be enhanced by bending portions of certain panels in different directions when the vehicle model is in its erected condition. For example, front panel 38 has an upper wind deflector portion 78 which may be bent back in a direction toward intermediate cross panel 26, as best illustrated in FIG. 3.

While the principles of this invention have been described in connection with specific embodiments, it should be understood clearly that these descriptions are made only by way of example and are not intended to limit the scope of the invention.

What is claimed is:

1. A portable device for modeling of vehicle graphics comprising:
   first and second flat opposite side panels each forming a side profile of the vehicle;
   at least two flat cross panels extending between the first and second side panels, including a front panel forming a front profile of the vehicle and a back panel forming a back profile of the vehicle;
   means hinging the cross panels to the first and second side panels whereby the panels are erectable to a three-dimensional vehicle model and collapsible to a flat stack, each of said panels having a first edge; and
   means along at least some of the first edges of the panels for removably securing graphics sheets against the panels.

2. The device of claim 1 wherein at least one of the cross panels and at least one of its adjacent side panels is of a continuous board and the hinging means therebetween is a fold in the continuous board.

3. The device of claim 2 wherein the continuous board is a flexible material and the fold is at a slit across the continuous board partially through the thickness of the flexible material.

4. The device of claim 3 wherein the flexible material is paperboard.

5. The device of claim 1 wherein at least one of the continuous cross panels and at least one of its adjacent side panels are separate boards and the hinging means therebetween is an interconnecting tape.

6. The device of claim 1 wherein the means for removably securing graphics sheets against a panel comprises pocket-forming means for insertion of at least a portion of a graphics sheet.

7. The device of claim 1 wherein permanent vehicle characteristic markings are on portions of at least some of the panels.

8. The device of claim 1 wherein the first and second side panels and the cross panels are formed of a single continuous board and the hinging means between side panels and cross panels are folds in the continuous board.

9. The device of claim 8 wherein the continuous board is a flexible material and each such fold is at a slit across the continuous board partially through the thickness of the flexible material.

10. The device of claim 9 wherein the flexible material is paperboard.

11. The device of claim 10 wherein there are three cross panels.

12. The device of claim 1 further comprising a foldable substantially flat enclosure dimensioned when folded to receive the collapsed flat stack for storage and when unfolded to serve as a display mount for the three-dimensional vehicle model.

13. The device of claim 12 wherein the side panels of the three-dimensional vehicle model have bottom-edge projections therealong and wherein the display mount has means thereon for engaging such projections and a surface with vehicle environment depictions thereon.

14. A portable device for modeling of vehicle graphics comprising:
   first and second flat opposite side panels each forming a side profile of the vehicle;
   at least two flat cross panels extending between the first and second side panels, including a front panel forming a front profile of the vehicle and a back panel forming a back profile of the vehicle;
   means hinging the cross panels to the first and second side panes whereby the panels are erectable to a three-dimensional vehicle model and collapsible to a flat stack; and
   a transparent sheet overlying at least one of the panels and forming against said panel a pocket for replaceable attachment of graphics sheets against said panel.

15. The device of claim 14 wherein said at least one of the panels has a bottom edge and the transparent sheet is secured to the panel along the bottom edge.

16. The device of claim 15 wherein the transparent sheet is flexible and is secured to the panel only along the bottom edge, thereby allowing the transparent sheet to be bent away from the panel to which it is attached to facilitate insertion and removal of replaceable graphics sheets.

17. A portable device for modeling of vehicle graphics comprising:
   first and second opposite side panels each forming a side profile of the vehicle;
   at least two flat cross panels extending between the first and second side panels, including a front panel forming a front profile of the vehicle and a back panel forming a back profile of the vehicle;
   means hinging the cross panels to the first and second side panels whereby the panels are erectable to a three-dimensional vehicle model and collapsible to a flat stack;
   means for replaceable attachment of graphics sheets on the panels, at least one of the side panels including a rectangular main portion having a bottom edge and projections from the bottom edge forming vehicle wheel profiles; and
   a transparent sheet overlying at least one of the panels and attached thereto along the bottom edge, the transparent sheet forming against said panel a pocket for replaceable attachment of graphics sheets against the rectangular main portion.

18. A portable device for modeling of vehicle graphics comprising:
   first and second flat opposite side panels each forming a side profile of the vehicle;
   at least two flat cross panels extending between the first and second side panels, including a front panel forming a front profile of the vehicle and a back panel forming a back profile of the vehicle;

means hinging the cross panels to the first and second side panels whereby the panels are erectable to a three-dimensional vehicle model and collapsible to a flat stack;

a transparent sheet overlying at least one of the panels and forming against said panel a pocket for replaceable attachment of graphics sheets against said panel; and permanent vehicle characteristic markings on portions of at least some of the panels, at least some such markings being on the transparent sheet.

19. The device of claim 18 wherein said at least one of the panels has a bottom edge and the transparent sheet is secured to such panel along the bottom edge.

20. The device of claim 19 wherein the transparent sheet is flexible and is secured to the panel only along the bottom edge, thereby allowing the transparent sheet to be bent away from the panel to which it is attached to facilitate insertion and removal of replaceable graphics sheets.

* * * * *

UNITED STATES PATENT AND TRADEMARK OFFICE
CERTIFICATE OF CORRECTION

PATENT NO. : 4,713,012

DATED : December 15, 1987

INVENTOR(S) : Judith A. Poplawski and David J. Andersen

It is certified that error appears in the above-identified patent and that said Letters Patent is hereby corrected as shown below:

Column 1, line 20, the word "frequency" should be --frequently--;

Column 3, line 56, the word "poential" should be --potential--;

Column 5, line 30, the phrase "For example, for" should be --For example, the --; and Column 7, line 1, the phrase "and to be" should be --and be--.

Signed and Sealed this

Seventh Day of June, 1988

*Attest:*

DONALD J. QUIGG

*Attesting Officer*     *Commissioner of Patents and Trademarks*